US007841003B1

United States Patent
Emdee

(10) Patent No.: US 7,841,003 B1
(45) Date of Patent: Nov. 23, 2010

(54) PHISHING SOLUTION METHOD

(75) Inventor: Warner Allen Brandt Emdee, Dale City, VA (US)

(73) Assignee: Capital One Financial Corporation, McLean, VA (US)

( * ) Notice: Subject to any disclaimer, the term of this patent is extended or adjusted under 35 U.S.C. 154(b) by 1496 days.

(21) Appl. No.: 11/121,524

(22) Filed: May 4, 2005

(51) Int. Cl.
*G06F 21/00* (2006.01)
*H04L 29/06* (2006.01)

(52) U.S. Cl. .......................................... 726/22
(58) Field of Classification Search ............... 726/22
See application file for complete search history.

(56) References Cited

U.S. PATENT DOCUMENTS

| 5,781,901 A | 7/1998 | Kuzma |
| 6,449,635 B1 | 9/2002 | Tilden, Jr. et al. |
| 6,651,087 B1 | 11/2003 | Dennis |
| 7,096,498 B2 * | 8/2006 | Judge ........................... 726/22 |
| 7,380,277 B2 * | 5/2008 | Szor ............................. 726/24 |
| 7,415,726 B2 * | 8/2008 | Kelly et al. .................... 726/24 |
| 2002/0029250 A1 * | 3/2002 | Reiner ......................... 709/206 |
| 2002/0138583 A1 | 9/2002 | Takayama |
| 2004/0034688 A1 | 2/2004 | Dunn |
| 2004/0078422 A1 | 4/2004 | Toomey |
| 2005/0008225 A1 | 1/2005 | Yanagisawa |
| 2005/0071748 A1 * | 3/2005 | Shipp ....................... 715/501.1 |
| 2007/0101423 A1 * | 5/2007 | Oliver et al. .................. 726/22 |
| 2007/0294762 A1 * | 12/2007 | Shraim et al. ................. 726/22 |
| 2008/0172382 A1 * | 7/2008 | Prettejohn ....................... 707/6 |

FOREIGN PATENT DOCUMENTS

JP        2002/222286        8/2002

* cited by examiner

*Primary Examiner*—Gilberto Barron, Jr.
*Assistant Examiner*—Abdulhakim Nobahar
(74) *Attorney, Agent, or Firm*—Baker & McKenzie LLP

(57) ABSTRACT

A method for preventing phishing attacks is provided. The method in one aspect includes identifying a source image file that was used fraudulently, replacing the content of the source image file with a warning, and allowing the source image file having the warning to be accessed.

16 Claims, 3 Drawing Sheets

Subject: ISSUE: Pending payment on your account
Importance: High

**THIS IS A FRAUD E-MAIL!!!
DELETE THIS E-MAIL!!!** ~ 302

We recently received a request from one Jewelry Shop located in Quebec, CANADA to enable the charge of $119,49 on your card.

THE PAYMENT IS PENDING FOR THE MOMENT.

• If the purchase was made by yourself, please ignore or remove this email message.

If you authorize the purchase, the billing will be assumed as an Exception Payment motivated by our Geographical Tracking System. As a result you will be personally contacted by one of our security departments.

• If the purchase was not made by you and would like to decline the $119,49 billing to your card, please follow the link below to decline the current issue:

Continue

Complete the form with the correct information, so we can identify you as the rightful owner of the credit card.

We apologize for any inconvenience this may cause, and appreciate your assistance in helping us maintain the integrity of the entire system.

Thank you for your prompt attention to this matter.

Please do not reply to this mail. Mail sent to this address cannot be answered

PHISHING SOLUTION METHOD

TECHNICAL FIELD

This application relates generally to preventing fraudulent hacking activities on computer networks, and more particularly to preventing phishing activities on the Internet.

BACKGROUND

Phishing is one of the fastest growing forms of fraud that is prevalent on the Internet today. Phishing attacks typically involve sending fraudulent e-mails to individuals in order to solicit sensitive information such as confidential personal information, account numbers, social security numbers, and passwords from the recipients. The e-mails appear to come from a legitimate company such as a bank, retailer or other e-commerce business. The information obtained from unsuspecting individuals are used for fraudulent purposes, for example, to access the person's account or use the person's identity information to facilitate further fraud with other parties—for instance, to deceive other parties into believing that they are dealing with that person.

Phishing attacks typically use a false "from" address, copies of company logos, Web links, and graphics to make the e-mails look like the genuine e-mails from the companies with which the recipients of the e-mails have business dealings, thus taking advantage of customer trust in the company's identity and brand names. To trick the recipient into believing that the source of the communication is the genuine company, phishing attacks use the company's logo from the company's website or the company's website links in the e-mails or communications. It is apparent then that such phishing attacks result in serious damages to the company's reputation to say nothing of the undermining effect it has on general e-commerce business.

SUMMARY

A method for preventing or deterring phishing attacks is provided. In one aspect, the method includes identifying a source image file that was used fraudulently in a spoofed e-mail. The source image file is renamed. The content of the original source image file is then replaced with a warning message. The warning message may be in a form of graphics image, text, or the like or combinations thereof. The warning message file is installed on a web server so that it can be accessed as the original file. In another aspect, the traffic to the warning message file is monitored, for example, to assess the number of fraudulent e-mails.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 3 illustrates an example of an e-mail that embeds the source link that was changed into a warning.

DETAILED DESCRIPTION

The method and apparatus relates to deterring or preventing phishing activities. Phishing refers to the act of sending an e-mail to a user falsely claiming to be an established legitimate enterprise in an attempt to scam the user into surrendering private information that will be used for identity theft. The e-mail directs the user to visit a Web site where the user is asked to update personal information, such as passwords and credit card, social security, and bank account numbers, that the legitimate organization already has. The Web site, however, is bogus (counterfeit or faked) and set up only to steal the user's information.

In order to convince the users that the spoofed e-mail is genuine, the spoofed e-mails typically embed source link of a legitimate company's logo, for instance, acquired from a corporate web site. Because HTML (hypertext markup language) code is publicly accessible through a browser, the phishing scammers can easily mimic the source link of a company's logo from the HTML code of a legitimate corporate web site, and embed that link into the fraudulent email. When the user opens that spoofed e-mail, the corporate logo appears as if the e-mail came from that company.

Figure 1:
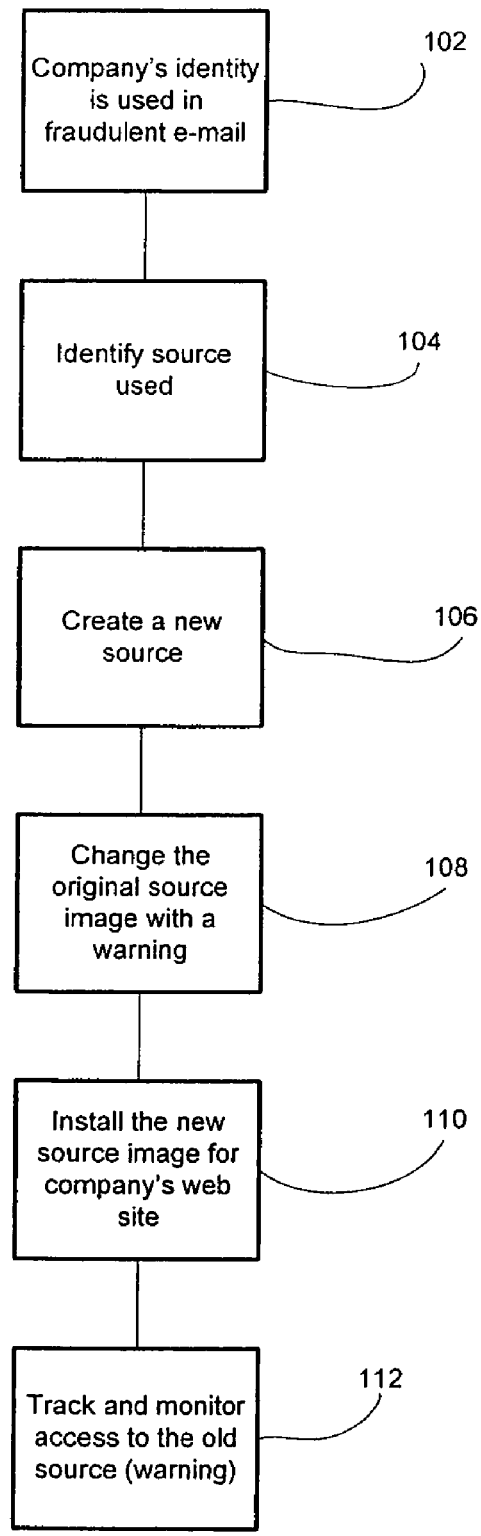
FIG. 1 is a flow diagram illustrating a method for providing a phishing solution in one embodiment.

The method disclosed in the present application in one embodiment deters this fraudulent e-mail or at least notifies the recipients of the possible fraud. FIG. 1 is a flow diagram illustrating a method for providing a phishing solution of the present disclosure in one embodiment. At 102, it is determined that a company or enterprise's logo or the like was used in a fraudulent e-mail, for example, to steal information from the e-mail recipient. This information may have been provided, for instance, by the recipients of the fraudulent e-mail who reported to the company that they had received such e-mails. Other methods may be employed to discover whether the source link was used fraudulently.

At 104, the source image, for example, a logo image file used in the e-mail is identified. The logo image file, for instance, may have been obtained from a company's web site source code, typically viewable using a browser. For Example, HTML source code used to display a company's web page may include a "<img src>" command with a location or link to a company's logo image or the like. Because the source HTML pages are available on the Web browser, anyone or automated method looking at the page can access this link.

The method, in one embodiment, identifies at 104 the source image or link, for example, a logo image file, that was used in the fraudulent e-mail. This may be done, for example, by examining the fraudulent e-mails used in phishing attacks. These e-mails, for example, would have the link to the file that contains the source image of the company logo embedded in them. Once the name of the file or the link used in the fraudulent e-mail is determined, a new source file for the company's logo is created at 106. At 108, the content of the original file is replaced with a warning. The warning, for example, can be a graphic image, text, combination of image and image, or any other form that tells the recipient that the e-mail is fraudulent and that they should not reply to the e-mail. In one embodiment, the warning object includes at least a graphics animation providing a warning message. Thus, any subsequent fraudulent emails sent with a link to this source image file would contain a warning message instead of a company logo that a fraud perpetuator intended.

FIG. 3 illustrates an example of an e-mail that embeds the source link that was changed into a warning according to the method described above. The e-mail 300 is a sample fraudulent e-mail that was sent with an image source changed from a company logo to a warning 302. The senders of this e-mail 300 accessed an image source link of what they believed to contain a company logo. However, according to the method of the present disclosure in one embodiment, the contents of that image source link was replaced with a warning 302 instead. If the image source was not changed, the warning 302 would have contained a company logo of an enterprise, for example, a bank.

With respect to the genuine company logo for use for example on the company website, a new name may be used. For instance, the original content, that is, the company logo, may be renamed as another file or link and that file or link may be used in displaying or operating the company website. Referring to FIG. 1, at 110, the new source image logo is installed for the corporate Web site. The new source image logo, for example, is the same logo but has a different file name.

In the meantime, in one embodiment, at 112, the web traffic that is hitting the old image (that is, the image replaced with warning) is monitored and recorded for tracking purposes. Monitoring and tracking traffic may be performed by monitoring web logs that access the source image.

Figure 2:
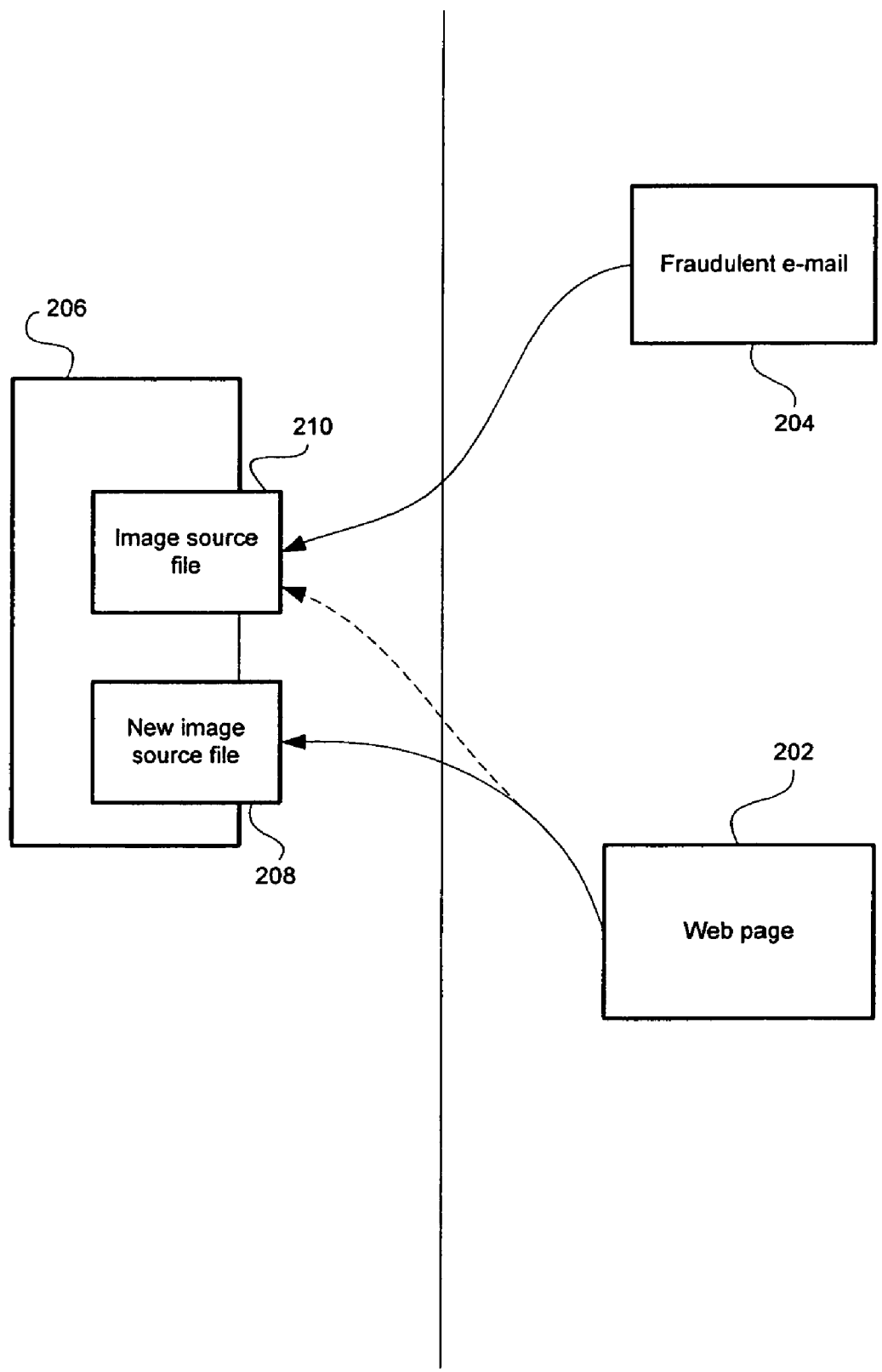
FIG. 2 is an example of an HTML page that includes a link to the source image.

FIG. 2. is a block diagram illustrating the method of deterring phishing in one embodiment. A company typically sets up a server directory 206 that allows users or processes to access its files legitimately, including image files. An example is a web server directory that includes various files accessible by web browsers 202 to display web page contents. A file 210 may contain data that represents company's identity or logo or the like. As explained above, because anyone or any process can access the file 210, it is also prone to fraudulent uses. Thus, for example, a fraudulent e-mail 204 may embed or otherwise include a link to this file 210 such that when the e-mail is displayed to the recipient, the content of the file 210 is also displayed with the e-mail message.

In order to deter this type of fraudulent usage, the phishing solution method of the present disclosure in one embodiment, when it detects that this file 210 is not being used legitimately, replaces the contents of the file 210 from the company's logo image to a warning. The warning may include a graphics image, text, sound, and/or any other type of alert that tells the recipient that the e-mail is fraudulent. For legitimate uses, a new file 208 is created that contains the original company logo or the like. Thus, a legitimate web browser 202 accessing a company logo to display as part of the web page will henceforth access the new image source file 208.

In another embodiment, the company's website implementation may be changed or enhanced by allowing only the main page with the original logo, for example, as a bait. A company may have several different websites offering different products and services. On these pages, hot linking (the process of displaying content from another website) would be prevented. The coding methods for preventing hot linking are well known to those skilled in the art and therefore will not be described here in detail. The main home page would still have the company logo unprotected from hot linking, therefore making it the likely source of phishing attempts. This would concentrate the phishing attacks to one location making them easier to track and thwart. This will increase the effectiveness of the anti-phishing solution.

In all other pages, logo images are sourced with the session layer to prevent easy hijacking of the company logo. The web server will look at what is known as the HTTP referer (also known as HTTP referrer), which is the referring address for the HTTP request. If this request does not come from the company's domain, the server will deny the request. In one embodiment, therefore, the method may include determining a referring address of a requestor requesting the new file and denying the request if the referring address does not match a known address. In some such embodiments, the determining and the denying steps are performed for web pages other than a main home page. When the company's images are displayed in a phishing e-mail, the referrer address will show the mail server for the email service it was delivered to, and therefore, will be denied by the company's web server.

The method of the present disclosure may be implemented and run on a general-purpose computer. The embodiments described above are illustrative examples and it should not be construed that the present invention is limited to these particular embodiments. Thus, various changes and modifications may be effected by one skilled in the art without departing from the spirit or scope of the invention as defined in the appended claims.

I claim:

1. A method for deterring fraudulent e-mails, comprising:
   identifying a source image file from a web server directory that was used fraudulently in the fraudulent e-mails by examining the fraudulent e-mails used in a phishing attack;
   transferring a source image in the source image file to a new file;
   replacing the content of the source image file on the web server directory with a warning; and
   allowing the source image file having the warning to be accessed on the web server directory, and
   monitoring a number of accesses to the source image file having the warning
   wherein the steps of the method are implemented by a computer.

2. The method of claim 1, wherein the source image file used fraudulently is identified as being embedded in a fraudulent e-mail.

3. The method of claim 1, wherein the warning includes graphics image or text or combinations thereof.

4. The method of claim 1, wherein a link to the source image file is embedded in a fraudulent e-mail.

5. The method of claim 1, wherein the source image file is copied from a legitimate Web site source code.

6. The method of claim 1, further including: determining a referring address of a requestor requesting the new file; and denying the request if the referring address does not match a known address.

7. The method of claim 6, wherein the determining and the denying steps are performed for web pages other than a main home page.

8. A method of deterring fraudulent e-mails, comprising:
   identifying an enterprise identifying object in a Web page on a web server directory as being a subject of fraudulent use in the fraudulent emails by examining the fraudulent e-mails used in a phishing attack;
   replacing the object on the web server directory with a warning object, the warning object having the same name as the object;
   installing the warning object on the web server directory to be accessed;
   renaming the enterprise identifying object on the web server directory; and
   installing the renamed enterprise identifying object on the Web page on the web server directory, and
   monitoring a number of accesses to the warning object,
   wherein the steps of the method are implemented by a computer.

9. The method of claim 8, wherein the enterprise identifying object is a link to an image of a company logo.

10. The method of claim 8, wherein the enterprise identifying object is a file having an image of a company logo.

11. A method of deterring fraudulent e-mails, the method comprising:

identifying an enterprise identifying object in a Web page as being a subject of fraudulent use in the fraudulent emails by examining the fraudulent e-mails used in a phishing attack;
replacing the object with a warning object, the warning object having the same name as the object;
installing the warning object to be accessed;
renaming the enterprise identifying object; and
installing the renamed enterprise identifying object on the Web page, and
monitoring a number of accesses to the warning object,
wherein the method resides on a non-transitory program storage device readable by machine, embodying a program of instructions executable by the machine.

12. The program storage device of claim 11, wherein the enterprise identifying object includes at least a company logo.

13. The program storage device of claim 11, wherein the warning object includes at least a warning message.

14. The program storage device of claim 11, wherein the warning object includes at least a graphics animation providing a warning message.

15. The program storage device of claim 11, further including: determining a referring address of a requestor requesting the renamed enterprise identifying object; and denying the request if the referring address does not match a known address.

16. The program storage device of claim 15, wherein the determining and the denying steps are performed for web pages other than a main home page.

* * * * *